(12) United States Patent
Lovett et al.

(10) Patent No.: US 12,472,320 B2
(45) Date of Patent: Nov. 18, 2025

(54) ENDOTRACHEAL INTUBATION ASSISTANCE APPARATUS AND METHOD OF USE THEREFOR

(71) Applicant: Koumpi LLC, Newtown, PA (US)

(72) Inventors: Paris Lovett, Newtown, PA (US); Oleg Bordyakov, Newtown, PA (US)

(73) Assignee: Koumpi LLC, Newtown, PA (US)

( * ) Notice: Subject to any disclaimer, the term of this patent is extended or adjusted under 35 U.S.C. 154(b) by 847 days.

(21) Appl. No.: 17/825,901

(22) Filed: May 26, 2022

(65) Prior Publication Data

US 2023/0381438 A1     Nov. 30, 2023

(51) Int. Cl.
*A61M 16/04* (2006.01)
*A61M 25/01* (2006.01)

(52) U.S. Cl.
CPC .... *A61M 16/0488* (2013.01); *A61M 16/0402* (2014.02); *A61M 25/0102* (2013.01)

(58) Field of Classification Search
None
See application file for complete search history.

(56) References Cited

U.S. PATENT DOCUMENTS

| | | | |
|---|---|---|---|
| 4,369,991 A * | 1/1983 | Linder | A61M 39/10 604/905 |
| 5,267,984 A * | 12/1993 | Doherty | A61M 16/0463 128/207.14 |
| 7,017,578 B2 | 3/2006 | Tresnak et al. | |
| 7,140,370 B2 | 11/2006 | Tresnak et al. | |
| 8,505,531 B2 | 8/2013 | Pecherer et al. | |
| 8,764,638 B2 | 7/2014 | Schwartz et al. | |
| 9,414,743 B2 | 8/2016 | McGrath | |
| 9,427,543 B2 | 8/2016 | Wei et al. | |
| 9,572,946 B2 * | 2/2017 | Chun | A61B 1/267 |
| 9,750,913 B2 | 9/2017 | Schwartz et al. | |
| 9,888,832 B2 | 2/2018 | Schwartz et al. | |
| 10,758,708 B2 | 9/2020 | Gardner | |
| 10,842,963 B2 * | 11/2020 | McCormick | A61B 1/0052 |
| 11,998,700 B2 * | 6/2024 | Mansi | A61M 39/223 |
| 2007/0102000 A1 * | 5/2007 | Dhuper | A61M 16/0486 128/207.14 |

(Continued)

FOREIGN PATENT DOCUMENTS

| | | |
|---|---|---|
| EP | 3402383 B1 | 4/2020 |
| WO | 2018009964 A1 | 1/2018 |
| WO | 2020210327 A1 | 10/2020 |

*Primary Examiner* — LaToya M Louis
(74) *Attorney, Agent, or Firm* — Quarles & Brady LLP; James J. Aquilina (57) ABSTRACT

An Endotracheal Intubation Assistance Apparatus (EIAA) and a method for operating said apparatus during oral intubation process are disclosed herein. The apparatus comprises: a Support Component having a Support Base at one end and a Button Component at another end. The Support Base is capable of being mounted upon an Endotracheal Tube that accommodates a stylet during an intubation process, and the Button Component is adapted to be manually depressed towards the tip of the Endotracheal Tube for thereby advancing the Endotracheal Tube until the Endotracheal Tube is disengaged from the stylet. The apparatus may have a Locking Component for fixating the stylet within the endotracheal tube.

16 Claims, 8 Drawing Sheets

(56) References Cited

U.S. PATENT DOCUMENTS

| | | | |
|---|---|---|---|
| 2007/0255258 A1* | 11/2007 | Matlock | A61M 16/0427 604/535 |
| 2008/0017195 A1* | 1/2008 | Yoshida | A61M 16/0418 128/200.26 |
| 2018/0064895 A1 | 3/2018 | Sadoughi | |
| 2020/0139064 A1 | 5/2020 | Hill | |
| 2024/0423741 A1* | 12/2024 | Inouye | A61B 34/71 |

* cited by examiner

ENDOTRACHEAL INTUBATION ASSISTANCE APPARATUS AND METHOD OF USE THEREFOR

FIELD OF THE INVENTION

The present disclosure is generally directed to the field of airway management and examination of the upper airway in a patient, and in particular to the apparatuses that permit examination and/or instrumentation of the upper airway and/or intubation.

BACKGROUND

Endotracheal Intubation is a medical procedure in which a breathing tube, also known as an Endotracheal Tube ("ETT"), is inserted into a patient's trachea. The tube is inserted either via the mouth (orotracheal intubation) or the nose (nasotracheal intubation). Intubation is performed to provide mechanical ventilation, or to protect the airway, or both. Common medical scenarios in which intubation is required include patients who are under general anesthesia, critically ill patients, critically injured trauma patients, and patients experiencing drug overdoses, among other scenarios.

Intubation is a challenging procedure requiring extensive training, experience, and skill. It is literally a life-and-death procedure. If the procedure goes wrong, patients can die or suffer severe and permanent injury. The core challenge in performing orotracheal intubation is that there is a 90-degree bend in the path which the Endotracheal Tube must follow, from the mouth, around the back of the tongue, to the vocal cords ("VC"), which are the gateway to the trachea. It is not possible to view the vocal cords directly through the mouth without positioning of the patient and manipulation with a device.

The device used to provide a view of the vocal cords for intubation is known as a laryngoscope. The laryngoscope gives the person performing the intubation a view of the VC so that the Endotracheal Tube may be passed through the VC and into the trachea.

For around a century, Direct Laryngoscopy (DL) has been the dominant approach to intubation. Direct Laryngoscopy straightens the 90-degree bend enough so that an 'Intubator' (i.e., physician, nurse anesthetist, paramedic, or other skilled person who is performing the intubation process on the patient) may get a peek at the VC directly through the mouth. The patient is often placed in what is termed a "sniffing position" to partially straighten out the bend. Then the Intubator uses the L-shaped direct laryngoscope to lift up the tongue and the jaw, further straightening out the path from mouth to vocal cords. The Endotracheal Tube is typically molded into a nearly straight shape, often with a small curve at the end. This shape is maintained by placing a stiff but moldable rod inside the Endotracheal Tube, known as a stylet. The Endotracheal Tube is placed through the VC under direct vision.

In the 21$^{st}$ century, an alternative approach known as Video Laryngoscopy (VL) has become increasingly popular. Rather than providing a direct view, a video laryngoscope incorporates a camera which is positioned near the vocal cords, and an image of the vocal cords and the area above them is shown on a screen.

A popular example of a video laryngoscope is the GlideScope (Verathon Inc.; Bothell, WA). Unlike a DL laryngoscope, the GlideScope does not straighten out the 90-degree bend between the mouth and the vocal cords. Rather, it has a curved blade which fits around the bend, with a camera on the end of the blade.

When using the GlideScope for intubation, because the 90-degree bend is not straightened out, the ETT must follow a 90-degree bend. This requires that the Endotracheal Tube be shaped with a 90-degree bend, rather than the almost straight shape used for DL. In order to provide that, a rigid metal stylet with a 90 degree bend is used: typically the GlideRite stylet (Verathon Inc.; Bothell, WA).

The Intubator uses one hand (almost exclusively the left hand, even for Intubators who are left-handed) to introduce the laryngoscope through the mouth and around the back of the tongue, and to manipulate the laryngoscope to obtain and maintain a view of the vocal cords. The Intubator uses the other hand (almost exclusively the right hand) to introduce the Endotracheal Tube (with stylet inserted to maintain the shape of the Endotracheal Tube) through the mouth, and around the back of the tongue, until the tip of the Endotracheal Tube is opposite the VC. The Intubator is then ready to "advance" the Endotracheal Tube off the stylet and through the vocal cords. Often, the Intubator wants the part of the Endotracheal Tube which passes the vocal cords to not have the stylet within it, in order to avoid traumatizing the tissues of the airway with the tip of the stylet.

A problem arises while using the GlideScope video laryngoscope and GlideRite stylet. The stylet must be secured within the Endotracheal Tube so it does not shift or fall out during the procedure. This is achieved by firmly jamming or "wedging on" the connector of the Endotracheal Tube ("ETT Connector") over the plastic handle of the GlideRite. However, once the Intubator is ready to advance the Endotracheal Tube off the stylet, the ETT Connector must be "un-wedged" or "disengaged" from the handle of the GlideRite. Then, the stylet must be partially withdrawn from inside the Endotracheal Tube, or the Endotracheal Tube must be slid down so that it is partially off the stylet, and the tip of the Endotracheal Tube advanced through the vocal cords.

The left hand of the Intubator is fully occupied holding the laryngoscope to maintain the view of the vocal cords, so all of this must be achieved using the right hand. This typically involves several changes of position and grip with the right hand, which are challenging and unwieldy. The problematic nature of the maneuvers to disengage and advance the Endotracheal Tube are reflected in multiple approaches advocated and demonstrated in textbooks, journal articles, and educational materials, including materials provided by Verathon for its GlideScope and GlideRite products. One approach is to use the right thumb to "pop" or disengage the GlideRite out of its wedged position and partially withdraw the GlideRite out of the Endotracheal Tube. Another is to use the fingertips to "pop" the connector off the GlideRite handle and push the Endotracheal Tube down and partially off the GlideRite. Another approach involves the Intubator taking the Intubator's left hand off the laryngoscope and using that hand to disengage and advance the Endotracheal Tube off the stylet. Still another approach involves having an assistant disengage and advance the Endotracheal Tube off the stylet.

These existing approaches are not just challenging and unwieldy, these also introduce significant risk. For example, unintended movement of the laryngoscope or the Endotracheal Tube can result in trauma to the tissues of the airway, loss of view, delay in intubation, failure to intubate on the first attempt (reduced "first pass success"), greater number of attempts, misplacement of the Endotracheal Tube, or outright failure to intubate. These problems can lead to severe injury and disability or death for patients.

While GlideScope and GlideRite and orotracheal intubation via VL have been used for this discussion, these same problems and need for an improved approach can apply to other approaches and devices for intubation.

There is a need for a device and method for advancing endotracheal tubes off stylets, which would be applicable to commonly available or generic endotracheal tubes and stylets of a variety of makes and models. Such a device and method would benefit from being able to disengage or un-wedge an endotracheal tube from a stylet if the endotracheal tube and/or connector has been firmly wedged onto the stylet, from being able to fixate or lock in place the endotracheal tube on the stylet prior to intubation and being able to unlock for removal of the stylet.

Prior art has provided several examples of stylets which are maneuverable and/or which have illumination and cameras mounted on the distal tip, and which have some mechanism for securing an endotracheal tube in place during intubation (WO2020210327A1 Perez-Lizano, U.S. Pat. No. 8,505,531B2 Pecherer, U.S. Pat. No. 9,888,832B2, U.S. Pat. No. 9,750,913B2 and U.S. Pat. No. 8,764,638B2 Schwartz, US2018064895A1 Sadoughi). However, these do not provide for disengagement or advancement, nor do they provide for locking or unlocking, of a generic endotracheal tube. There are examples of modified ETT Connectors which provide for stabilization of a bougie (US20200139064A1 Hill) or stylet (U.S. Ser. No. 10/758,708B2 Gardner) but these do not provide for disengagement or advancement, they require replacement of the generic ETT Connector which can be undesirable, and they are designed for different purposes that the need identified above. US20200139064A1 Hill is designed to allow passage of an elastic bougie beyond the tip of an endotracheal tube. U.S. Ser. No. 10/758,708B2 Gardner is designed to allow a stylet to be positioned with the tip of the stylet beyond the tip of the endotracheal tube. There are devices which provide for stabilizing or locking a stylet in place within an endotracheal tube (U.S. Pat. No. 9,427,543B2 Wei, U.S. Pat. No. 9,414,743B2 McGrath), however these do not provide for disengagement or advancement, and are designed for different purposes, namely to allow angling of the tip of the stylet towards VC which cannot be visualized (U.S. Pat. No. 9,427,543B2 Wei) and as part of an integrated and proprietary stylet, endotracheal tube, and carbon dioxide detection system, rather than generic endotracheal tubes and stylets of a variety of makes and models.

In view of the above, the present subject matter as disclosed herein, aims to provide a novel Endotracheal Intubation Assistance Apparatus ("EIAA") which may be used to address the problems of the prior art.

SUMMARY

The present subject matter discloses an Endotracheal Intubation Assistance Apparatus (hereinafter 'EIAA') which addresses the drawbacks of earlier known solutions. The EIAA apparatus is adapted to be placed on an ETT Connector prior to placing the stylet in the Endotracheal Tube.

According to an embodiment of the present subject matter, an apparatus for assisting an intubation process is provided. The apparatus comprises: a Support Component having a Support Base at one end and a Button Component at another end; with the Support Base connected via a Support Bridge to a Support Mounting Ring, wherein the Support Component is capable of being mounted upon an ETT Connector. Said ETT Connector remains inserted in an Endotracheal Tube during an intubation process, and the Button Component is adapted to be manually depressed towards the tip of the Endotracheal Tube, thereby disengaging the Endotracheal Tube Connector and Endotracheal Tube from being firmly wedged onto the stylet, and also advancing the Endotracheal Tube in a controlled way along and partially off the stylet.

According to an embodiment of the present subject matter, a Lock Component slidably adapted between the Support Base and the Button Component, the Lock Component being slidably operated upon the Support Column to fixate the stylet in a desired position during the intubation process.

According to an embodiment of the present subject matter, the Lock Component comprises a movable Lock Flap and a Lock Mounting Ring. The Lock Flap is switched to any one of: a locking position to secure the stylet within the Endotracheal Tube, and an unlocking position to release the stylet from the Endotracheal Tube.

According to an embodiment of the present subject matter, the apparatus is adapted to be integrated with a stylet.

According to an embodiment of the present subject matter, the apparatus is adapted to be integrated with an Endotracheal Tube Connector to be inserted into the Endotracheal Tube.

According to an embodiment of the present subject matter, the apparatus is a single-use disposable apparatus.

According to an embodiment of the present subject matter, the apparatus is a multiple use cleanable and sterilizable apparatus.

According to an embodiment of the present subject matter, a method is disclosed for assisting in endotracheal intubation process. The method comprises: configuring an apparatus for providing endotracheal intubation assistance, the apparatus having a Support Component having a Support Base at one end and a Button Component at another end; mounting the apparatus upon an Endotracheal Tube via a connector provided on the Endotracheal Tube; and pressing the Button Component towards the tip of the Endotracheal Tube for thereby disengaging the Endotracheal Tube and Endotracheal Tube Connector from the stylet, and for advancing the Endotracheal Tube in a controlled manner along and partially off of the stylet, the stylet being accommodated by the Endotracheal Tube during an intubation process.

Other objects and advantages of the embodiments herein will become readily apparent from the following detailed description taken in conjunction with the accompanying drawings.

BRIEF DESCRIPTION OF THE DRAWINGS

The figures mentioned in this section are intended to disclose exemplary embodiments of the claimed system and method. Further, the components/modules and steps of a process are assigned reference numerals that are used throughout the description to indicate the respective components and steps. Other objects, features, and advantages of the present invention will be apparent from the following description when read with reference to the accompanying drawings:

FIG. 1b, FIG. 1c, and FIG. 1d illustrate, respectively, a rear view (Intubator view), side view, and top view of the Endotracheal Intubation Assistance Apparatus (EIAA) of FIG. 1a.

FIG. 2a is a perspective view of a Support Component of the EIAA of FIG. 1a.

FIG. 2b, FIG. 2c, FIG. 2d, and FIG. 2e illustrate, respectively, a top view, rear view (Intubator view), side view, and cross section view of the Support Component of FIG. 2a.

FIG. 5b, FIG. 5c, FIG. 5d, and FIG. 5e illustrate, respectively, a top view, rear view (Intubator view), side view, and cross section view of the Support Component of FIG. 5a.

FIGURES-REFERENCE NUMERALS

1 Support Mounting Ring
2 Support Base
3 Support Bridge
4 Support Column
5 Lock Mounting Ring
6 Lock Flap
7 Lock Bore
8 Button Component Exterior Surface
9 Button Component Bore
10 Button Component Wall
11 Button Component Opening
12 Rotational Stabilizer
13 Side View of EIAA mounted on ETT with Stylet, Locked Position
14 Rear (Intubator) View of EIAA mounted on ETT with Stylet, Locked Position
15 Side View of EIAA mounted on ETT with Stylet, Unlocked Position
16 Rear (Intubator) View of EIAA mounted on ETT with Stylet, Locked Position
17 Handle of Stylet
18 Top of ETT Connector
19 Middle of ETT Connector
20 Bottom of ETT Connector
21 Top of Endotracheal Tube
22 Support Column with Circular Sectional Profile
23 Support Component with Support Column with Tracks
24 Support Column with Tracks
25 Endotracheal Tube
26 Support Component
27 Lock Component
28 Button Component
29 Support with Rotational Stabilizers
30 EIAA Assembled
31 Support Component with Support Column with Circular Sectional Profile
32 Lock Bore with Ridge
33 Lock Component with Lock Bore with Ridge
34 Tip (of Endotracheal Tube)
35 Long axis (of Support Column 4)
36 Short axis (of Support Column 4)
37 Long axis (of Lock Bore 7)
38 Short axis (of Lock Bore 7)
39 Long axis (of Button Component Bore 9)
40 Short axis (of Button Component Bore 9)

List of Abbreviations

EIAA—Endotracheal Intubation Assistance Apparatus
VC—Vocal Cords
ETT—Endotracheal Tube
ETT Connector—Endotracheal Tube Connector
DL—Direct Laryngoscopy (performed with a direct laryngoscope)
VL—Video Laryngoscopy (performed with a video laryngoscope)

DETAILED DESCRIPTION OF THE INVENTION

This section is intended to provide explanation and description of various possible embodiments of the present invention. The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings.

According to an embodiment of the present invention, an Endotracheal Intubation Assistance Apparatus (EIAA) is provided. It has a lock which can be swung into place using the right thumb, to secure the stylet within the ETT. This obviates the need for the stylet to be firmly wedged onto the handle of the stylet.

Figure 1A:
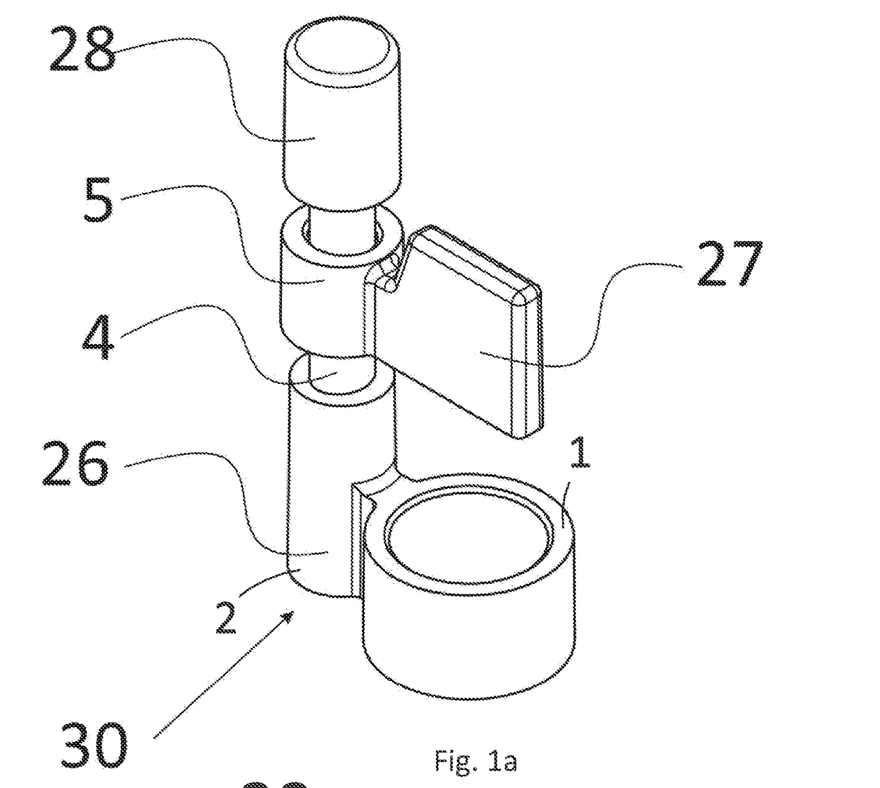
FIG. 1a, according to an embodiment of the present invention, is a perspective view of the Endotracheal Intubation Assistance Apparatus (EIAA).
Figures 1B, 1C:
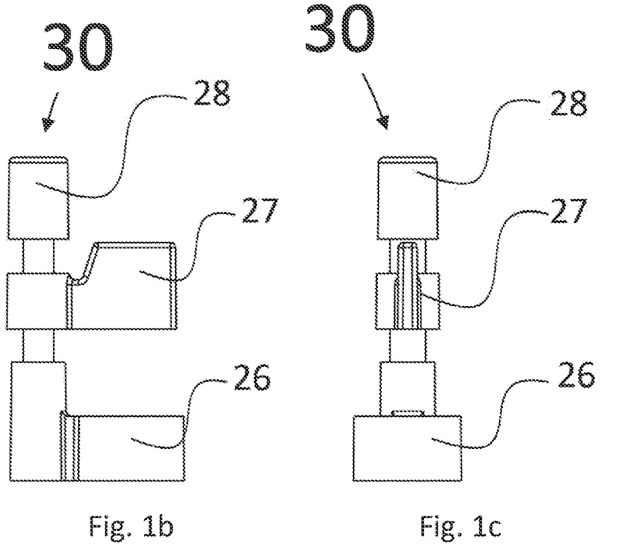
Figure 1D:
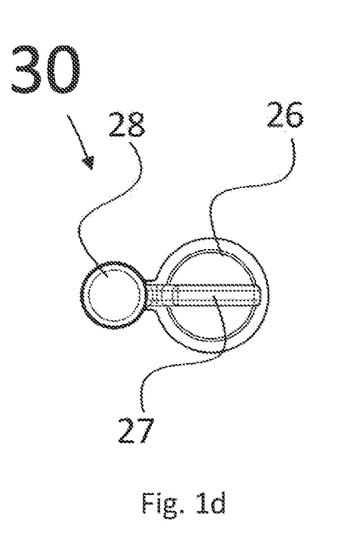
Figures 2A, 2B, 2C, 2D, 2E:
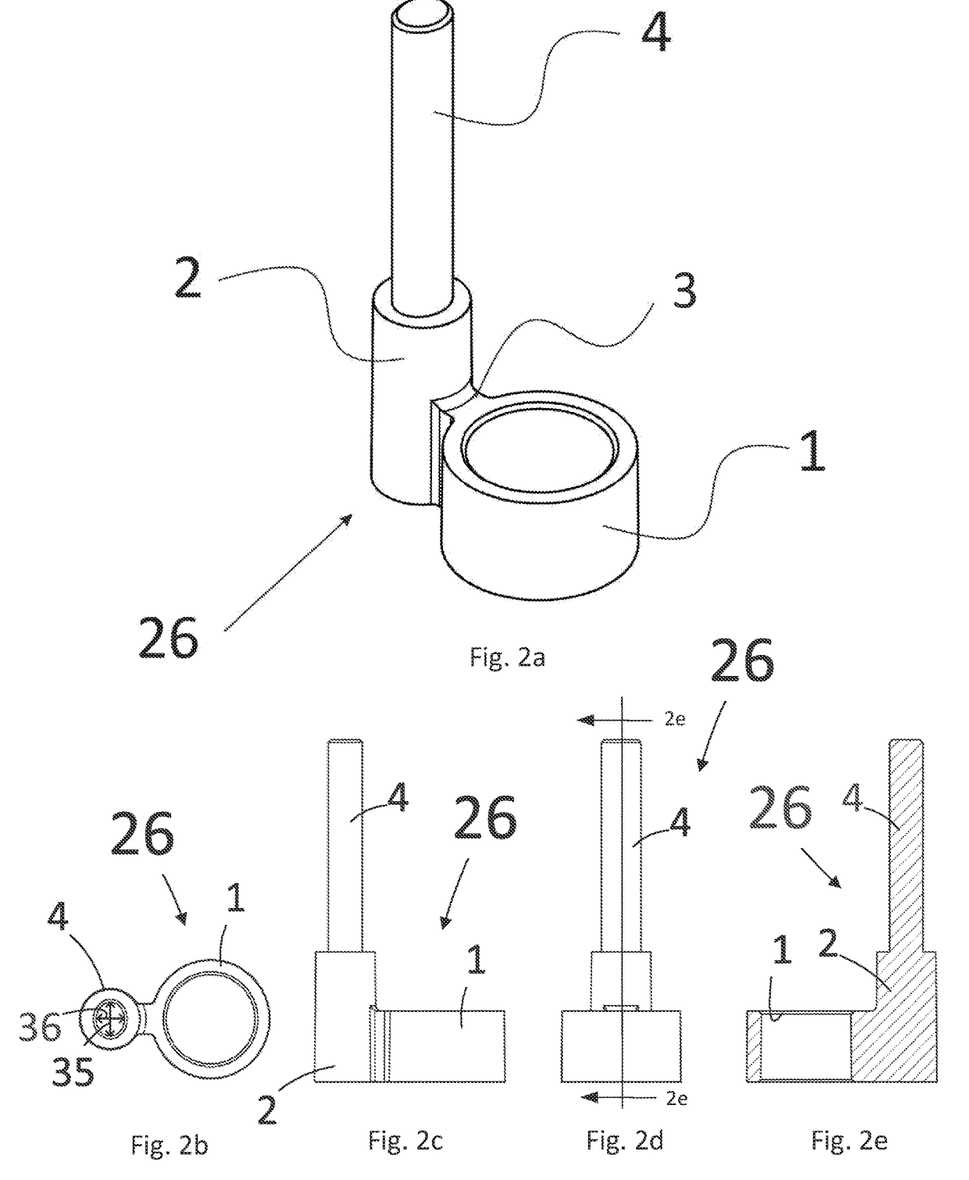

FIG. 1a, according to an embodiment of the present invention, is a perspective view of the apparatus i.e., Endotracheal Intubation Assistance Apparatus (EIAA) 30. The apparatus comprises: a Support Component 26 with a Support Column 4 having a Support Base 2 at one end and a Button Component 28 at another end; wherein the Support Mounting Ring 1 is capable of being mounted upon an Endotracheal Tube (ETT) via an Endotracheal Tube Connector (ETT Connector); wherein said Endotracheal Tube accommodates a stylet during an intubation process, and the Button Component 28 is adapted to be manually depressed towards the Tip 34 of the Endotracheal Tube for thereby disengaging the Endotracheal Tube from the stylet, and for advancing the Endotracheal Tube until the Endotracheal Tube is partially off the stylet.

According to an embodiment of the present subject matter, a Lock Component 27 slidably adapted between the Support Base 2 and the Button Component 28, the Lock Component 27 being slidably operated upon the Support Column 4 to fixate the stylet in a desired position during the intubation process. The Lock Component 27 comprises a Lock Mounting Ring 5 and a movable Lock Flap 6. The Lock Flap 6 may be switched to any one of: a locking position to secure the stylet within the Endotracheal Tube, an unlocking position to release the stylet from the Endotracheal Tube, or allow insertion of the stylet into the Endotracheal Tube.

The apparatus is adapted to be mounted upon an Endotracheal Tube connector (or ETT Connector). The apparatus may also be adapted to be integrated with a stylet. The apparatus may also be adapted to be integrated with an ETT Connector. The apparatus may also be adapted to be mounted directly on an Endotracheal Tube. Further, according to various embodiments of the present invention, the apparatus may be a single-use disposable apparatus or a multiple use cleanable and sterilizable apparatus.

Once the user or the Intubator is ready to advance the Endotracheal Tube, the Lock Component 27 is swung into the unlocked position. The EIAA 30 obviates the need for forceful wedging of the ETT onto the stylet, and thus no disengagement of the ETT off the stylet is required by the user/Intubator; however the EIAA 30 does provide for such disengagement. The EIAA 30 has a trigger, or Button Component 28, which can be pressed down by the thumb of one hand, to disengage the ETT off the stylet handle (if the Intubator has chosen to wedge it only firmly), and to advance the ETT off the stylet in a controlled fashion. All of this can be performed with the just one hand, without unwieldy maneuvers or changes of grip, minimizing unintended movements of the ETT 25 or the laryngoscope, and allowing the user/Intubator to watch and focus upon the progress of the ETT tip 34 throughout the intubation procedure.

Referring now to FIG. 1a, a perspective view of the EIAA 30 in an assembled state is shown, with the Lock Component 27 and the Button Component 28 mounted on a Support Component 26. The Lock Mounting Ring 5 of the Lock Component 27 surrounds the Support Column 4 of the Support Component 26. The Button Component 28 fits on an end of the Support Column 4. The Lock Component 27 can be rotated around the Support Column 4 of the Support Component 26, and can also slide up and down along the Support Column 4. Owing to the oval cross-sectional shapes of the Support Column 4 and Lock Bore 7 of the Lock Component 27 in this embodiment (which have respective long axes 35,37 and short axes 36,38), when rotated 90 degrees around the Support Column 4, the Lock Component 27 becomes jammed in place so that it cannot slide up and down the Support Column 4. When rotated 90 degrees the other way, the Lock Component 27 is released so that it can once more slide freely up and down the Support Column 4. The Button Component 28 in this embodiment similarly has an oval cross-sectional profile (for its opening 11) and can thus be locked in place by rotating 90 degrees and unlocked by rotating another 90 degrees. The Button Component 28, at the top of the Support Column 4, prevents the lock 27 from sliding off the end of the Support Column 4. The Button Component 28 can be pushed upon, in order to move the entire EIAA, and with it an Endotracheal Tube and ETT Connector on which the EIAA is mounted.

FIG. 2a, FIG. 2b, FIG. 2c, FIG. 2d and FIG. 2e illustrate perspective view, top view, rear view (Intubator view), side view, and cross section view of the Support Component 26 respectively. The Support Component 26 includes a Support Mounting Ring 1 which is designed to fit onto the top section of a standard ETT Connector (ETT Connectors generally are designed to follow standards such as ISO 5361:2016). The Support Base 2 is connected to a Support Column 4, and also connected to a Support Mounting Ring 1 by a Support Bridge 3. The Support Column 4, in this embodiment, is an elongated structure with oval cross-sectional profile and is situated on top of the Support Base 2. The Support Column 4 is designed to interface with other parts of the EIAA 30, namely the Lock Component 27 and the Button Component 28.

Figure 3A:
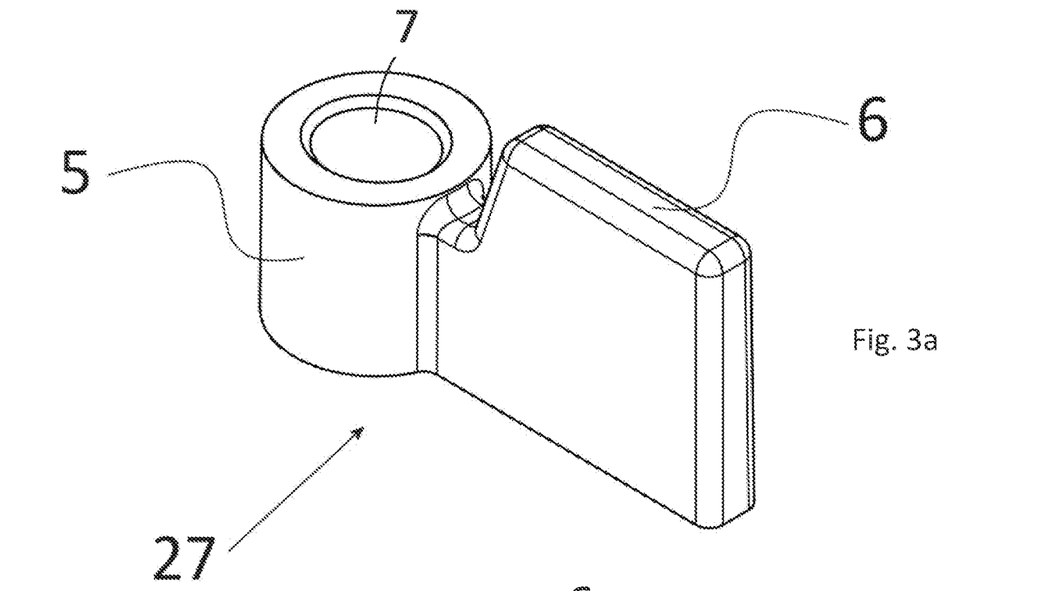
FIGS. 3a, 3b, and 3c illustrate, respectively, perspective, rear view (Intubator view), and top views of a Lock Component of the EIAA, respectively.
Figure 3B:
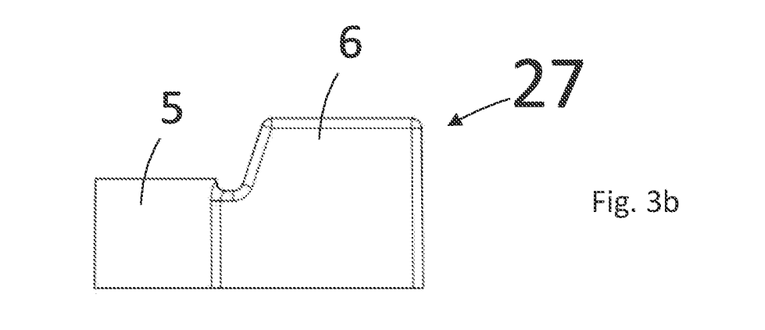
Figure 3C:
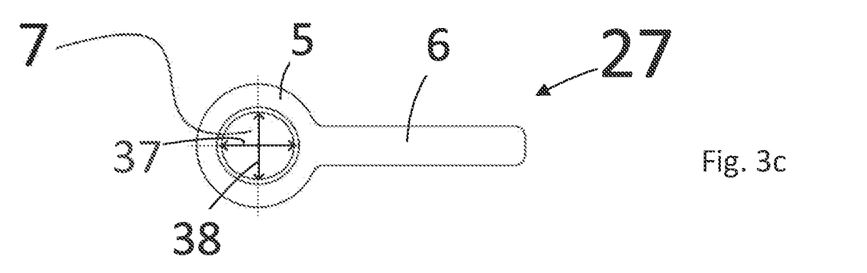

FIGS. 3a-3c, according to this embodiment of the present invention, illustrates a Lock Component 27 of the EIAA. The Lock Mounting Ring 5 is provided with a Lock Bore 7 which, in this embodiment, is oval in cross-sectional shape with long axis 37 and short axis 38. The Lock Component 27 is designed so that the Lock Bore 7 will fit over the Support Column 4. The oval shape of the Lock Bore 7 allows the Lock Component 27 to slide freely up and down the Support Column 4 when the Lock Component 27 is in an unlocked rotational position. When rotated 90 degrees, the oval Lock Bore 7 rotating around the Support Column 4—which is also oval in shape with long axis 35 and short axis 36—will become jammed so that the Lock Component 27 no longer slides freely up and down the Support Column 4. Rotating another 90 degrees will free the Lock Component 27 so that it can slide up and down the Support Column 4.

Figure 4A:
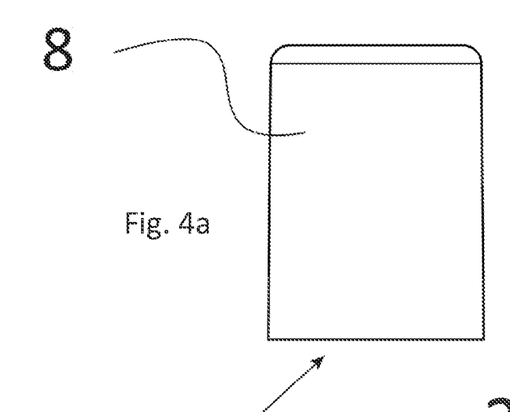
FIGS. 4a, 4b, and 4c illustrate, respectively, a side view, cross-sectional view, and bottom view of a Button Component adapted to fit at one end of a Support Column of Support Component of the EIAA.
Figure 4B:
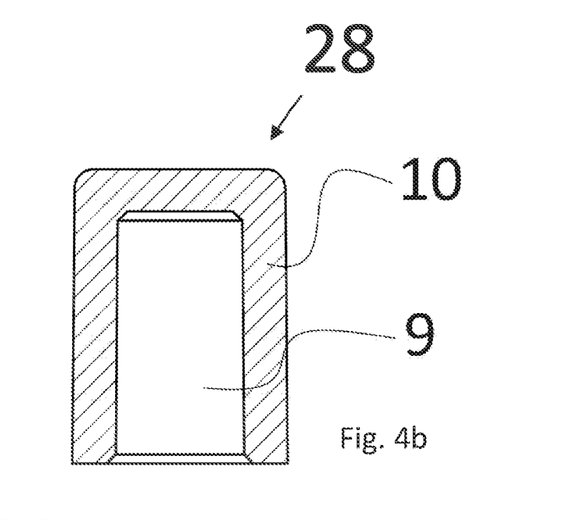
Figure 4C:
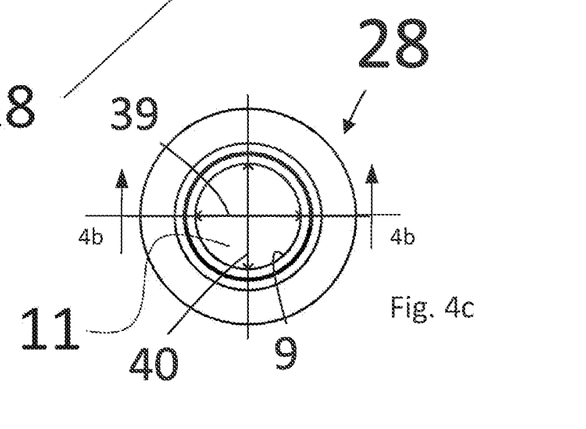
Figure 5A:
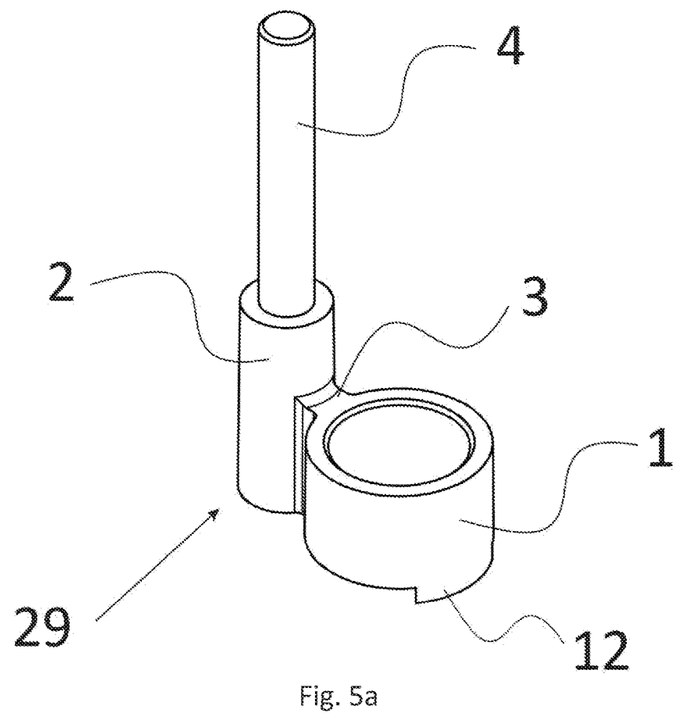
FIG. 5a is a perspective view of another embodiment of a Support Component of the EIAA, showing the Support Component with Rotational Stabilizers.
Figures 5B, 5C:
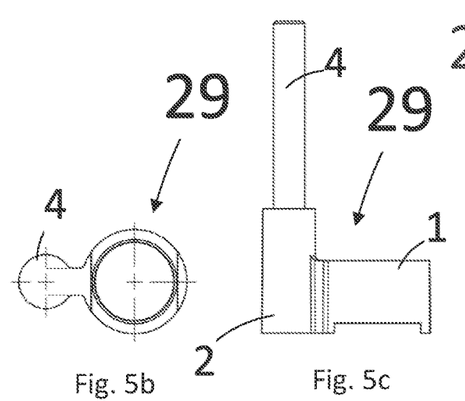
Figure 5D:
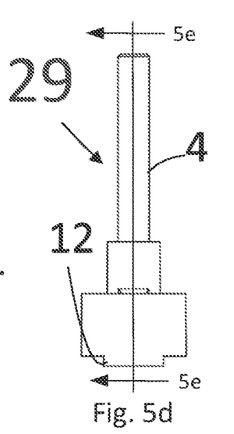
Figure 5E:
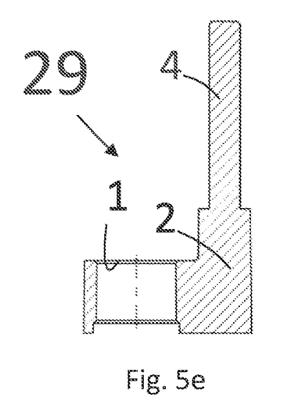
Figures 6A, 6B:
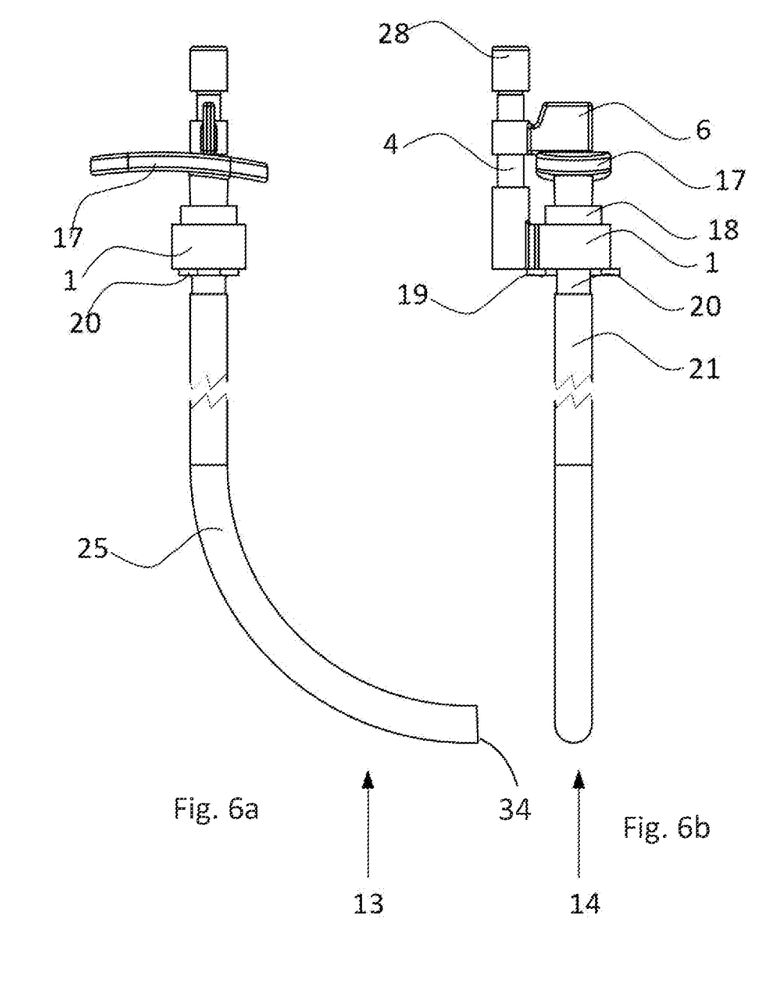
FIGS. 6a-6d, according to an embodiment of the present invention, illustrates four views of the EIAA mounted on an Endotracheal Tube Connector and Endotracheal Tube, with stylet inserted.
Figures 6C, 6D:
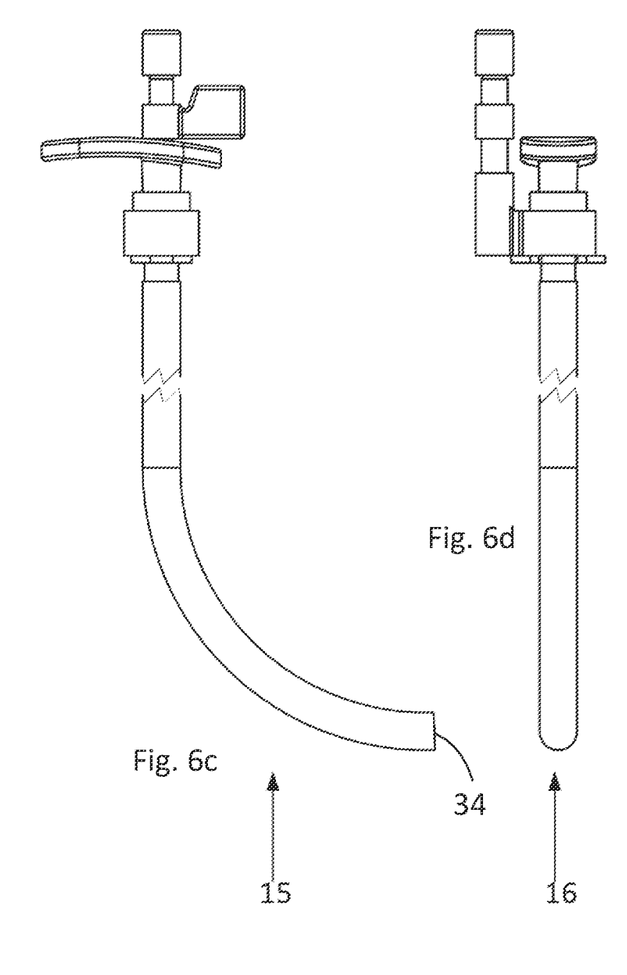

FIGS. 4a-4c, according to this embodiment of the present invention, illustrates a Button Component 28 adapted to sit at one end of the Support Column 4. The Button Component 28 comprises an outer wall 10, an inner bore 9, and an opening 11 on an underside of the Button Component 28. The inner bore 9 may be circular or oval in sectional profile. The Button Component 28 is designed to fit onto the top of the Support Column 4. In some embodiments, if the inner bore 9 has oval sectional profile with long axis 39 and short axis 40, it will attach to the Support Column 4 by turning 90 degrees. In alternative embodiments, it may be fixed to the Support Column 4 using an adhesive or other permanent bonding means.

FIG. 5a, FIG. 5b, FIG. 5c, FIG. 5d and FIG. 5e illustrate, respectively, perspective view, top view, rear view (Intubator view), side view, and cross section view of another embodiment of a Support Component with Rotational Stabilizers 29. In this embodiment, the Support Mounting Ring 1 has Rotational Stabilizers 12 on each side which prevents rotation of the support around an Endotracheal Tube Connector, when the Support Mounting Ring 1 is seated on the ETT Connector.

FIGS. 6a-6d, according to an embodiment of the present invention, illustrates the EIAA mounted on an Endotracheal Tube (ETT) 25 with stylet inserted. A side view 13 (FIG. 6a) of the apparatus shows the mounted EIAA 30 in locked position. A substantially rear view 14 (from the viewpoint of Intubator) (FIG. 6b) shows said mounted EIAA 30 in locked position. Another side view 15 (FIG. 6c) of said mounted EIAA 30 shows the EIAA 30 in unlocked position. Further, a substantially rear view 16 (from the viewpoint of Intubator) (FIG. 6d) of said mounted EIAA 30 shows the apparatus in unlocked position.

Figure 7A:
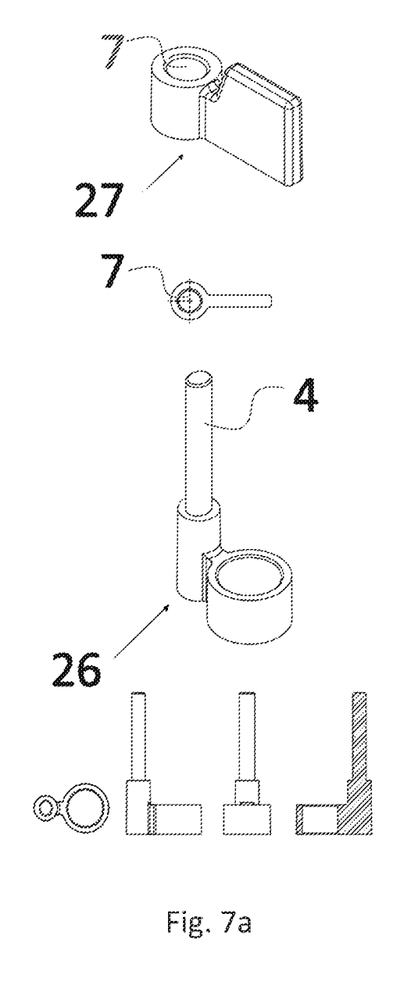
FIGS. 7a-7c, according to various embodiments of the present invention, illustrates three examples of locking mechanisms operating where the Locking Component is situated on the Support Column of the Support Component, between the Support Base and the Button Component.
Figure 7B:
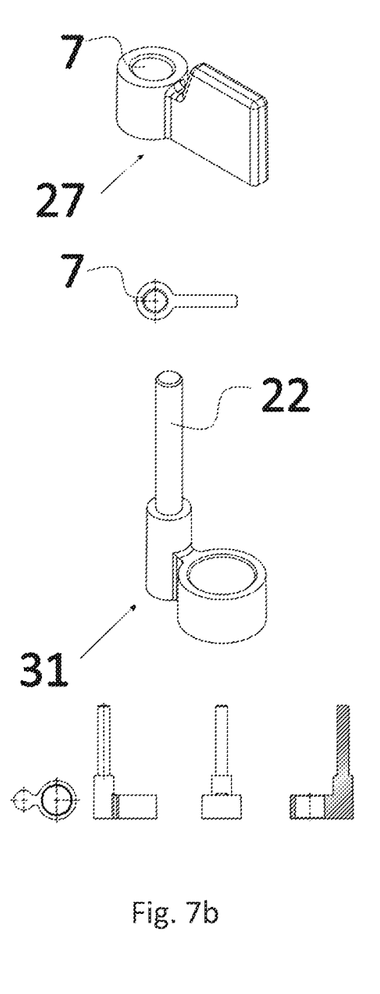
Figure 7C:
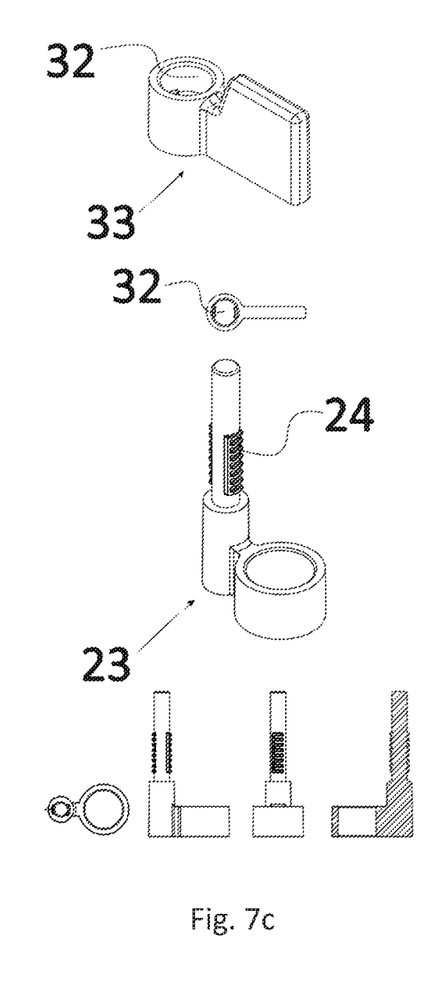

Each of FIGS. 7a-7c illustrates a Lock Component 27 adapted to be positioned slidably between the Support Base 2 and the Button Component 28 on the Support Column 4, according to a unique embodiment of the present invention. Each of these embodiments represents a different approach to the same objective, which is to allow the Lock Component 27 to freely slide up and down the Support Column 4, but when the Lock Component 27 is rotated around the Support Column 4, it is locked such that it is no longer free to slide up and down the Support Column 4. When the Lock Component 27 is rotated 90 degrees around the Support Column 4 again, it will no longer be locked and will once again be free to slide up and down the Support Column 4.

FIG. 7a (along with FIGS. 1a-4c) illustrates one embodiment, with a Support Column 4 that is oval in sectional profile and a Lock Bore 7 that is also oval in sectional profile. FIG. 7b illustrates another embodiment, with a Support Component with Support Column with Circular Sectional Profile 31 having a Support Column with Circular Sectional Profile 22 and a Lock Bore 7 that is oval in sectional profile. FIG. 7c illustrates another embodiment, with a Support Component with Support Column with Tracks 23 having a Support Column with Tracks 24 which is circular in sectional profile and has tracks oriented circumferentially bounded by raised borders, covering arcs of, for example, less than 100 degrees, on opposing sides of the support column. The tracks on the side of the support column which is nearest to the mounting ring have a raised longitudinally oriented border serving as a terminus. In this embodiment, the Lock Component with Lock Bore with Ridge 33 has a Lock Bore with Ridge 32, which bore is circular in sectional profile, and has a raised ridge oriented circumferentially within the bore, for example following an arc of less than 80 degrees, which ridge is designed to slide into the track of Support Column with Tracks 24. When by rotation the ridge of Lock Component with Lock Bore with Ridge 33 slides into place within the track and against the terminus of the Support Component with Support Column with Tracks 23, the Lock Component 27 with Lock Bore 7 with Grooves 33 will become locked.

Figure 8:
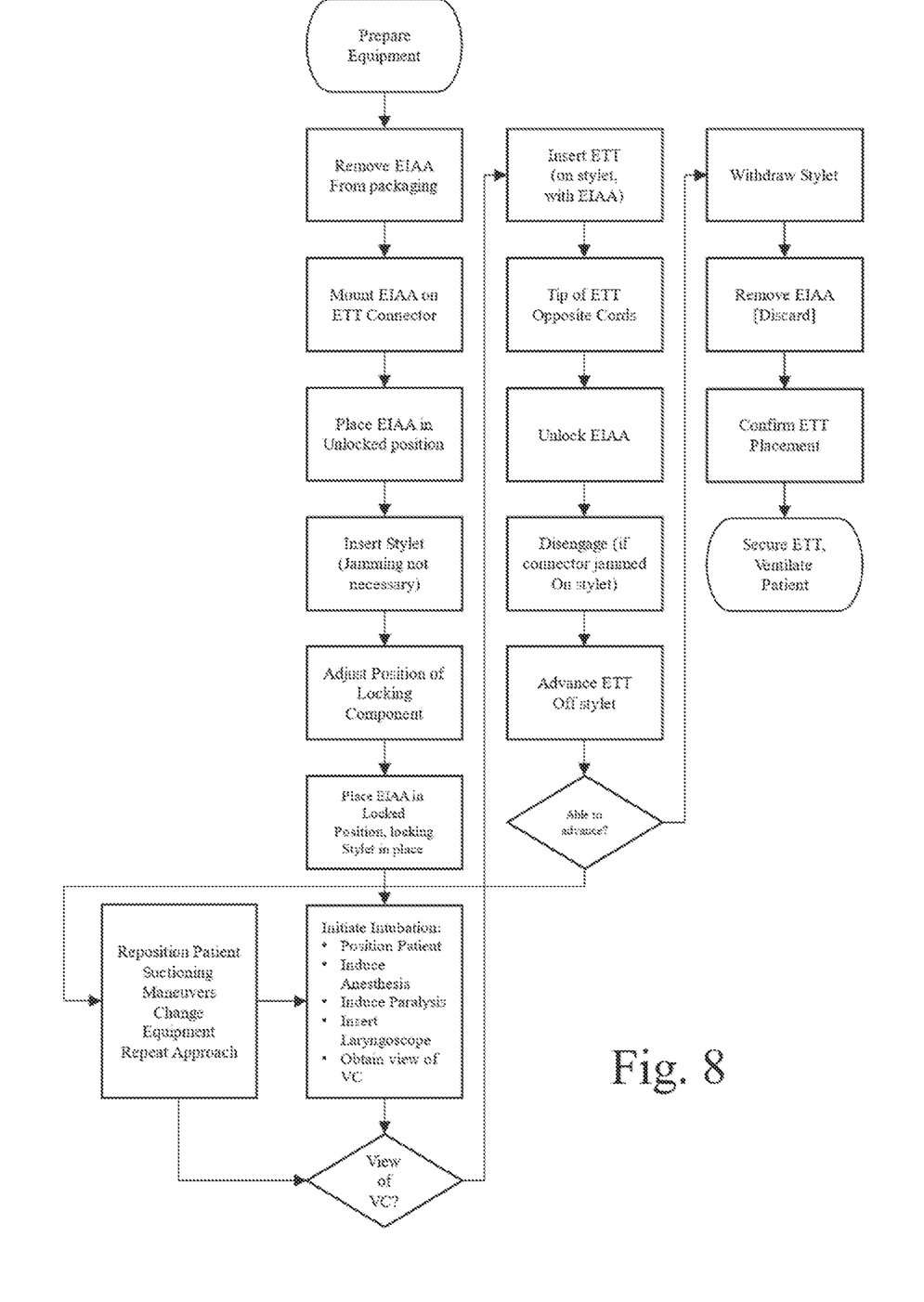
FIG. 8, according to an embodiment of the present invention, is a flowchart illustrating the method for using the EIAA to assist intubation of a patient.

FIG. 8, according to an embodiment of the present invention, is a flowchart illustrating a method for using the EIAA to assist intubation of a patient, according to the present invention.

To start the process of oral intubation, the Intubator may prepare all equipment including airway management equipment, monitoring equipment, ventilation equipment, and medications, among other things. The Intubator removes the EIAA from its packaging and mounts it upon the ETT Connector of the Endotracheal Tube with which the Intubator plans to intubate the patient. The Intubator then places the EIAA in the unlocked position, and inserts the stylet. The Intubator may choose to firmly wedge the stylet into the ETT Connector, but need not do so. The Intubator adjusts the position of the Lock Component 27 by sliding it up and down the Support Column 4 until it reaches a position where it will hold the stylet in place by sitting on top of the stylet handle or part of the stylet projecting beyond the ETT Connector. The Intubator swings the Lock Component 27 into the locked position, with the Lock Flap 6 atop the stylet handle. The Intubator then performs the initial stages of intubation in typical fashion, including induction of anesthesia, induction of paralysis, positioning of the patient, insertion of laryngoscope, and obtaining a view of the vocal cords. If a view of the vocal cords is not obtained, various maneuvers are undertaken until a view is obtained. When a view is obtained, the Intubator will insert the ETT in the typical fashion until the tip 34 of the ETT 25 sits near the vocal cords and is in the field of view of the operator, whether direct view or video view. At this point, the Intubator swings the EIAA Lock Component 27 into the unlocked position. If the stylet has been firmly wedged into the ETT Connector, then the Intubator presses upon the Button Component 28 to disengage the ETT Connector from the stylet. The Intubator thereafter presses further upon the Button Component 28 to advance the ETT off the stylet in a controlled fashion, so that the tip 34 of the ETT 25 advances off the stylet and towards the vocal cords and then between the vocal cords (VC). If the ETT 25 is not able to advance, the Intubator may perform various maneuvers to allow it to advance, or may begin another attempt. If the ETT advances into place, the Intubator will then remove the stylet in the typical fashion. The Intubator will then remove the EIAA from the ETT Connector, and if the EIAA is disposable, dispose of the EIAA. The Intubator will then inflate the balloon on the ETT (if any), confirm ETT placement, secure the ETT, attach the ETT Connector to a bag-valve or mechanical ventilator, and ventilate the patient.

An exemplary embodiment described below includes three parts fabricated from plastic using injection molding, then assembled as depicted in FIG. 1, then cleaned and/or sterilized and packaged in a sealed package.

In some exemplary embodiments, the Support Component 26 may be designed with the Support Base 2 being 10.9 mm in diameter and 23.1 mm in height, with a Support Column 4 arising from the top of said Support Base 2, also elongated in shape and oval in sectional profile, 6.4 mm in widest diameter (Long Axis of Support Column 35) and 6 mm in narrowest diameter (Short Axis of Support Column 36) and 37.8 mm in height, with a bridge 3 connecting said Support Base 2 to a Support Mounting Ring 1, said Support Mounting Ring 1 being shaped as a hollow cylinder, with outer diameter 21.1 mm and inner diameter 15.9 mm and height of 12.6 mm, with the total width including the diameter of said Support Base 2, diameter of said mounting ring 1, and length of said bridge 3 being 33.8 mm. Some edges of the Support Component 26 may be chamfered The Lock Component 27 may be designed with Lock Mounting Ring 5 shaped as a hollow tube with an oval-shaped Lock Bore 7, with outside diameter 12.4 mm and inside diameter 7.5 mm at its widest (Long Axis of Lock Bore 37) and 6.7 mm at its narrowest (Short Axis of Lock Bore 38). Said Lock Component 27 has a Lock Flap 6 attached to said Lock Mounting Ring 5, measuring 20.9 mm in length, 4 mm in width, and a height of 10 mm where attached to said Lock Mounting Ring 5, increasing to 17.2 mm for most of the body of said Lock Flap 6. The oval Lock Bore 7 is designed to lock into place when rotated around the Support Column 4, in order to prevent freely sliding up and down said Support Column 4. Some edges of the Lock Component 27 may be chamfered.

The Button Component 28 may be designed as a hollow tube of oval sectional profile, closed at the top end, with outside diameter 11.7 mm and inside diameter 7.5 mm at its widest (Long Axis of Button Component Bore 39) and 6.7 mm at its narrowest (Short Axis of Button Component Bore 40), and outside height of 15.9 mm and inside bore height of 13.7 mm. In some embodiments, the Button Component 28 is designed to be glued or welded onto the top of the Support Column 4 after placement of lock over Support Column 4, to prevent said lock sliding off the end of said Support Column 4, and to provide for being pushed upon by the Intubator, in order to move the EIAA, the ETT Connector and the Endotracheal Tube. Some edges of the Button Component 28 may be chamfered. The inside bore may be shaped to fit chamfering of the Support Column 4. In other embodiments, the Button Component 28 has an oval or eccentric bore, much the same as the shape of the lock ring bore, and can be firmly fixed onto the top of the Support Column 4 without use of adhesive or welding, as discussed above When designing molds for fabrication of parts for said EIAA, it may be necessary to scale each part iteratively and sequentially. In a first step, the Support Component 26 might be scaled such that the Support Mounting Ring 1 sits firmly enough upon the top of the ETT Connector to stay in place and prevent rotation, yet be easily placed upon and removed from the ETT Connector by the Intubator. In a second step, the Lock Component 27 might be scaled such that the Lock Bore 7 may slide freely up and down the Support Column 4 when in the unlocked position, yet lock onto the Support Column 4 when rotated into the locking position. In a third step, the Button Component 28 may be scaled to snugly and securely wedge onto the top of the Support Column 4, or alternatively scaled to fit more loosely on the Support Column 4, in order to allow another method of adhesion. The order of these steps could be modified in further embodiments of this method.

Some embodiments of the EIAA may be fabricated and constructed with materials and techniques for single use and thus be disposable, or the EIAA may be made with materials and techniques which make the EIAA amenable to cleaning, decontamination, sterilization, and/or re-packaging to permit the EIAA to be re-useable.

While FIGS. 6a-6d show the EIAA mounted on an ETT which has a GlideRite stylet inside it for use with a GlideScope Video Laryngoscope, the EIAA is designed to work with a broad array of available ETTs, ETT Connectors, stylets, direct laryngoscopes, and video laryngoscopes, among other approaches and apparatuses for intubation.

In other embodiments the EIAA or parts of the EIAA could be fabricated from metal, plastic, ceramics, or a combination of materials.

In another embodiment, the support has two Rotational Stabilizers on its bottom, which sit on either side of the middle part of the ETT Connector. These Rotational Stabilizers prevent rotation of the EIAA around the ETT Connector.

In another embodiment, the Support Column 4 of the Support Component 26 is circular rather than oval in sectional profile.

In another embodiment, the Support Column of the Support Component is circular rather than oval in sectional profile, and the Support Column has tracks oriented circumferentially on its surface, bounded by raised borders, covering arcs of less than, for example, 100 degrees, on opposing sides of the Support Column. The tracks on the side of the Support Column which is nearest to the Support Mounting Ring have a raised border oriented longitudinally to the Support Column, serving as a terminus to the tracks. In this embodiment, the Lock Bore of the Lock Component has a raised ridge within it, oriented circumferentially, following an arc of less than, for example, 80 degrees. Said ridge is designed to slide into the track on the Support Column when the Lock Component is rotated around the Support Column. When by rotation the ridge in the Lock Bore slides into the track on the Support Column, the Lock Component can no longer freely slide up and down the Support Column. When the Lock Component is rotated the other way, the ridge will move out from the track, and the Lock Component will be able to freely slide up and down the Support Column.

In another embodiment, the EIAA may be integrated into the stylet, so that the stylet can lock into place on the ETT Connector without being firmly wedged, and can be unlocked, disengaged, and the ETT advanced off the stylet.

In another embodiment, the EIAA may be integrated into an ETT Connector.

In another embodiment, the EIAA may be designed to attach to an Endotracheal Tube rather than an ETT Connector.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims which follow.

The invention claimed is:

1. A medical apparatus for use in a procedure for intubating a patient, the medical apparatus comprising:
   a support component including a mounting portion,
   a lock component including a lock mounting portion and a movable lock flap; and
   a depressible portion,
   the mounting portion being adapted to attach to an endotracheal tube connector and an endotracheal tube, the endotracheal tube being adapted to accommodate insertion of a stylet therein, the endotracheal tube having a tip that is located distal to its attachment location with the mounting portion, the lock component being located between the support component and the depressible portion and rotatable about the support component between a locked position in which the lock flap engages a top of the stylet so that the stylet is secured within the endotracheal tube and an unlocked position in which the lock flap disengages the top of the stylet so that the stylet is released from the endotracheal tube,
   wherein the depressible portion is movable towards the tip of the endotracheal tube to disengage the endotracheal tube from the stylet and allow for advancement of the endotracheal tube until the tip of the endotracheal tube is partially removed from the stylet,
   the support component further comprising a support column having an oval cross-sectional shape comprising a long axis and a short axis, the lock mounting portion having a complementary oval cross-sectional shape comprising a long axis and a short axis, wherein the locked position of the lock component is achieved by rotating the lock component so that the long axis of the lock mounting portion is parallel with the short axis of the support column.

2. The medical apparatus of claim 1, the lock mounting portion of the lock component being slidable along a support column of the support component to fix the stylet in a desired position during the intubation procedure.

3. The medical device of claim 1, wherein the unlocked position of the lock component is achieved by rotating the lock component so that the long axis of the lock mounting portion is parallel with the long axis of the support column.

4. An apparatus comprising:
   a Support Component having a Support Base at one end and a Button Component at another end:
   the Support Base being capable of being mounted upon an Endotracheal Tube Connector and an Endotracheal Tube that accommodates a stylet during an intubation process; and
   the Button Component being adapted to be manually depressed towards a tip of the Endotracheal Tube for thereby disengaging the Endotracheal Tube from the stylet, and for advancing the Endotracheal Tube until the Endotracheal Tube is partially off the stylet;

a lock component including a lock mounting portion and a movable lock flap;

the endotracheal tube having a tip that is located distal to its attachment location with the support base, the lock component being located between the support base and the button component and rotatable about the support component between a locked position in which the lock flap engages a top of the stylet so that the stylet is secured within the endotracheal tube and an unlocked position in which the lock flap disengages the top of the stylet so that the stylet is released from the endotracheal tube, the support component further comprising a support column having an oval cross-sectional shape comprising a long axis and a short axis, the lock mounting portion having a complementary oval cross-sectional shape comprising a long axis and a short axis, wherein the locked position of the lock component is achieved by rotating the lock component so that the long axis of the lock mounting portion is parallel with the short axis of the support column.

5. The apparatus of claim 4, further comprising the Lock Component slidably adapted between the Support Base and the Button Component, the Lock Component being slidable on the Support Column to fix the stylet in a desired position during the intubation process.

6. The apparatus of claim 4, wherein the apparatus is adapted to be integrated with the stylet.

7. The apparatus of claim 4, wherein the apparatus is adapted to be integrated with the Endotracheal Tube Connector.

8. The apparatus of claim 4, wherein the apparatus is attached to the Endotracheal Tube prior to insertion of the stylet into the Endotracheal Tube.

9. The apparatus of claim 4, wherein the apparatus is a single-use disposable apparatus.

10. The apparatus of claim 4, wherein the apparatus is a multiple-use cleanable and/or sterilizable apparatus.

11. A method comprising:

configuring an apparatus for providing endotracheal intubation assistance, the apparatus having a Support Component having a Support Base at one end and a Button Component at another end:

mounting the apparatus upon an Endotracheal Tube via a Connector provided on the Endotracheal Tube; and pressing the Button Component towards a tip of the Endotracheal Tube for thereby disengaging the Endotracheal Tube from a stylet and/or advancing the Endotracheal Tube off of the stylet, the stylet being accommodated by the Endotracheal Tube during an intubation process;

providing a lock component including a lock mounting portion and a movable lock flap;

the endotracheal tube having a tip that is located distal to its attachment location with the support base, the lock component being located between the support base and the button component and rotatable about the support component between a locked position in which the lock flap engages a top of the stylet so that the stylet is secured within the endotracheal tube and an unlocked position in which the lock flap disengages the top of the stylet so that the stylet is released from the endotracheal tube, the support component further comprising a support column having an oval cross-sectional shape comprising a long axis and a short axis, the lock mounting portion having a complementary oval cross-sectional shape comprising a long axis and a short axis, wherein the locked position of the lock component is achieved by rotating the lock component so that the long axis of the lock mounting portion is parallel with the short axis of the support column.

12. The method of claim 11, further comprising:

sliding the Lock Component upon the Support Column to fixate the stylet in a desired position during the intubation process.

13. The method of claim 12, further comprising:

switching the movable Lock Flap between one of a locking position to secure the stylet within the Endotracheal Tube, and an unlocking position to release the stylet from the Endotracheal Tube.

14. The method of claim 11, further comprising integrating the apparatus with the stylet.

15. The method of claim 11, further comprising integrating the apparatus with the Endotracheal Tube Connector.

16. The method of claim 11, further comprising mounting the apparatus upon the Endotracheal Tube.

* * * * *